Nov. 10, 1925.                                                                          1,560,601
                                    M. MUELLER
                         CLAY PRODUCT CUTTING MACHINE
                      Filed Sept. 27, 1923        3 Sheets-Sheet 1
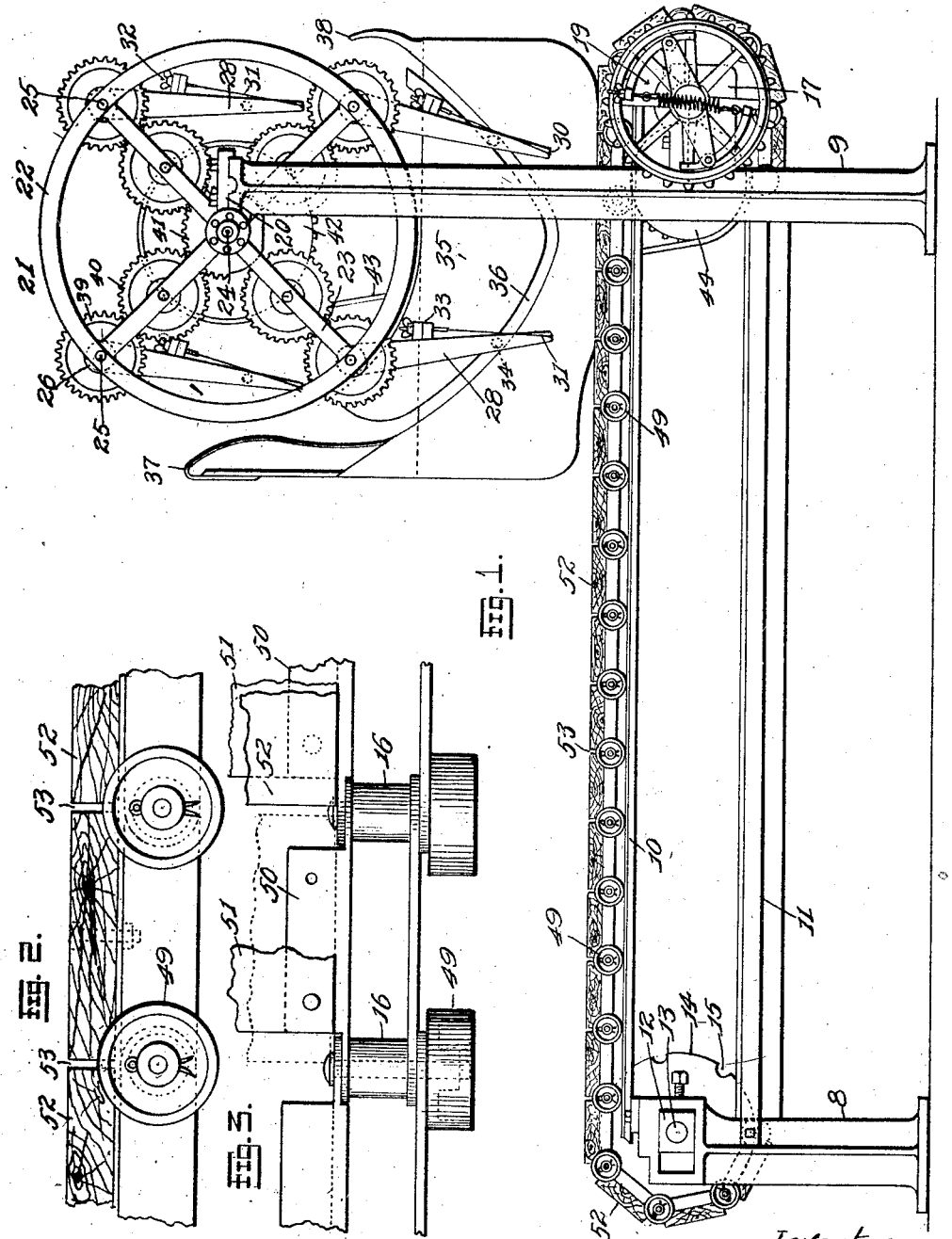
Inventor.
Max Mueller

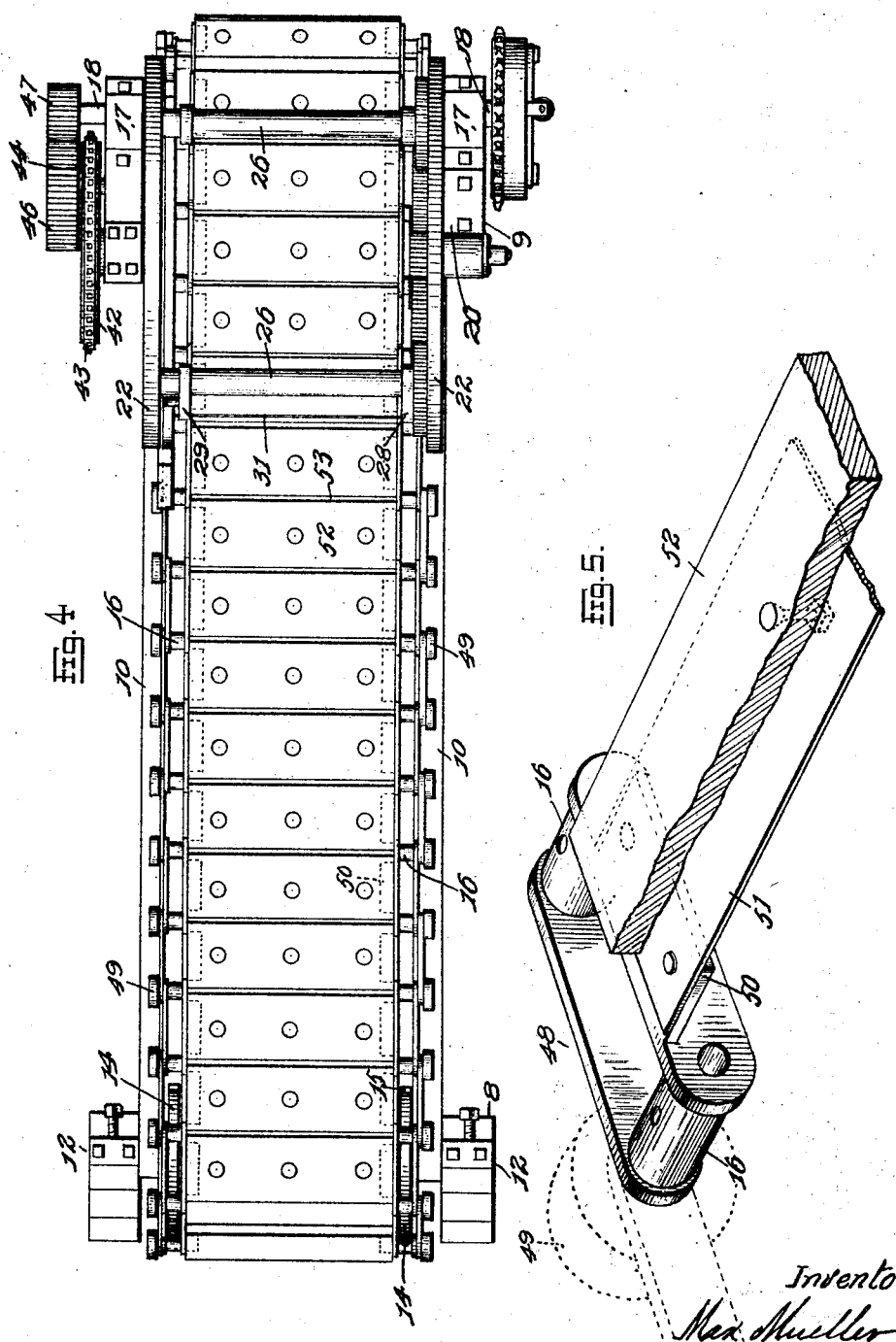

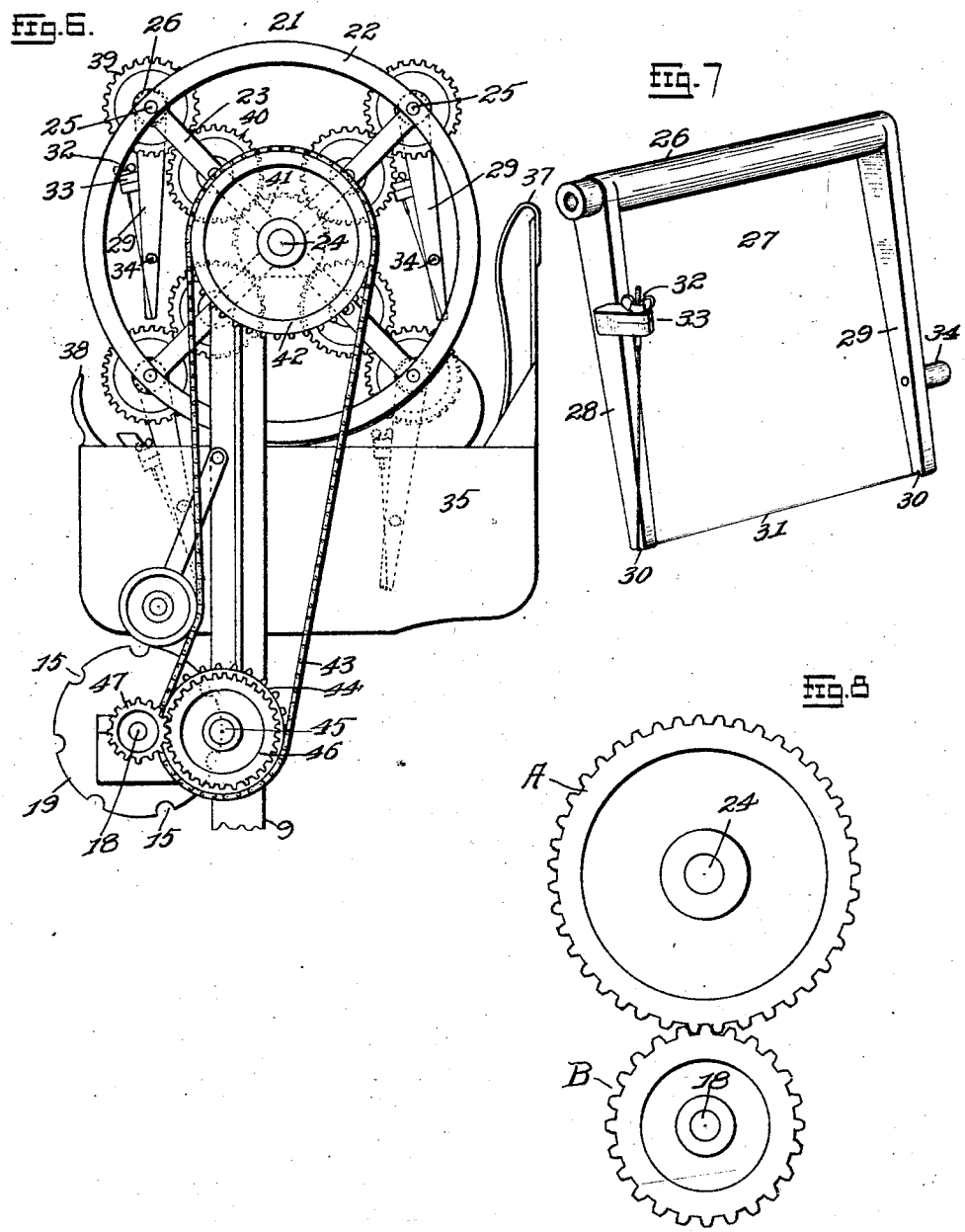

Patented Nov. 10, 1925.

1,560,601

UNITED STATES PATENT OFFICE.

MAX MUELLER, OF ST. LOUIS, MISSOURI.

CLAY-PRODUCT-CUTTING MACHINE.

Application filed September 27, 1923. Serial No. 665,106.

*To all whom it may concern:*

Be it known that I, MAX MUELLER, a citizen of the United States, and resident of St. Louis, Missouri, have invented certain new and useful Improvements in a Clay-Product-Cutting Machine, of which the following is a specification.

This invention relates to improvements in a clay product cutting machine, of the class used in the manufacture of hollow tile, brick, roofing tile, clay pipe, and miscellaneous articles constructed from clay. And it has for its object a machine equipped with an endless conveyer or table placed in movement by the formed column of clay as it comes from the forming die of the forming machine which is positioned relative to the cutting machine as to permit the clay column to contact with the conveyer, moving it at the same speed as the ejected clay column, and a means operated simultaneously by the moving table for cutting the column in predetermined, uniform lengths.

The essential feature of my invention is to construct a cutting machine with an endless sectional table or conveyer, the same geared to a cutting drum which is placed in simultaneous operation and its speed controlled by the moving table, and cutting devices carried by the drum for cutting the clay product in uniform predetermined lengths.

Another feature of my invention is the positive operation of the table and cutting devices, which are so controlled as to permit the cutting devices to enter the clay and make a straight cut during the movement of the column and to remove themselves without marring the perpendicular cut.

The machine is of simple construction, consisting of a table of endless formation, the same operating over special formed sprocket discs for guiding the same, a drum equipped with cutting devices, and a gear mechanism between the table control and the drum; the movement being positive, equal and simultaneous.

Figure 1 is a side view of my improved clay product cutting machine.

Figure 2 is a detailed, enlarged side elevation of a portion of the moving table.

Figure 3 is a detailed top plan view of the same with parts broken away.

Figure 4 is a top plan view of my complete machine.

Figure 5 is a detailed, sectional perspective view of one of the sections which are used to make up the table.

Figure 6 is a detailed side view of the cutting and gear mechanism made use of in carrying out my invention.

Figure 7 is a detailed perspective view of one of the cutting yokes which carry the cutting wire.

Figure 8 is a detailed side elevation of a modified form of gearing, which can be used in the place of a sprocket gear and chain.

I will now describe the general construction of my machine as illustrated in the accompanying drawings, to the precise construction of which I do not desire to limit myself, as the table sections are to be constructed in accordance with the size of the section into which the formed column of clay is to be cut, and the size of the gears which impart motion to the cutting drum by the movement of the table must necessarily be changed to correspond.

The machine as illustrated consists of a frame composed of standards, 8 and 9, by which are supported runways or tracks, 10, and a guard, 11. On the standards, 8, are adjustable journal bearing blocks, 12, in which is supported a shaft, 13, to which are firmly secured ratchet discs, 14, the periphery of which are provided with depressions, 15, arranged at intervals to correspond with and receive the hubs, 16, of the table sections.

On the standard, 9, are journal brackets, 17, supporting a shaft, 18, also equipped with sprocket discs, 19, constructed the same as the sprocket discs, 14, on the other end of the frame.

On the top of the standards, 9, are journals, 20, in which is rotatably mounted a drum, 21, constructed preferably of skeleton formation, and consisting of two side rims or wheels, 22, provided with spokes, 23, terminating to hubs from which project trunnions, 24, having bearing in the journals, the two wheels, 22, are connected together with cross rods or shafts, 25, over which are mounted the sleeves, 26, of the cutting yokes, 27. These sleeves have arms, 28 and 29, the bottom free ends having grooves, 30, for the reception of a cutting wire, 31, one end of the wire being fastened to one of the arms, the other extending up passing into a tightening screw, 32, held in a projection, 33. On the arm, 29, is a roller, 34, which is designed to guide the yokes during its travel as it enters and removes from the clay during the cutting process.

To one side of the front standards, 9, is provided a siding consisting preferably of a plate, 35, the inner surface equipped with a guide or cam groove, 36, in which the rollers, 34, travel during the cutting process.

This plate is provided with guides, 37 and 38, for directing the rollers in and out of the grooves, 36, without obstruction, and in order to prevent the yokes from swinging during the rotary motion of the drum, I provide on one side of one of the wheels, 22, a series of gears, 39, 40 and 41, the gear, 41, being stationary and only a portion of its periphery being toothed, a portion smooth, and the bottom flat, thus during the rotation of the drum, the gears control and assist in guiding the yokes, yet prevent idle swinging.

On one side of the drum and to one of the trunnions is fixed a gear or sprocket wheel, 42, over which is a chain, 43, and it is operated by a gear or sprocket wheel, 44, mounted on a stud, 45, supported by the standard, and on this stud and connected to the sprocket wheel is a gear wheel, 46, which meshes with a pinion 47, mounted on the shaft, 18.

This entire cutting mechanism is placed in operation and its speed controlled by the movement of the table, which during its motion rotates the sprocket discs, 14 and 19, and simultaneously the gear mechanism.

The table or endless conveyer consists preferably of sections of a required size. These sections comprise a link, 48, at each end, having hubs, 16, to these hubs are mounted rollers, 49, which travel on the runners or tracks, 10, the inner sections of the links have ears, 50, to which are attached connecting plates, 51, and on these plates are secured table sections, 52, on which the clay product is deposited, and each of said sections are spaced apart as indicated by the numeral, 53, into which the cutting wires, 31, extend after cutting through the column.

By the management of the cutting drum, and the cam groove, the cutting yokes are during their travel passed through the clay column, making a straight, perpendicular cut, then continue to travel with the table and then remove from the cut in a direct vertical line without marring the ends of the cut sections. The wire which does the cutting is, of course, controlled by the yokes and their position during the drums rotation.

Some of the cutting machines which I have made, especially where thin material is cut, are equipped with direct meshing gears as shown in Figure 8. In this instance the gear "A" is connected to the drum while the gear "B" is on the table shaft. This structure is used where the structure is low.

The operation of my invention is as follows:

The machine is set in close proximity with a forming machine, and as the formed clay column comes from the forming die, it slides on the endless table, moving the table at the same speed as the column is discharged from the die. As the column passes under the drum, the cutting wires are forced through the clay on a moving path, cutting the column into equal lengths with true vertical cut edges. The drum is simultaneously operated by the moving table through the agency of the intermediate gearing.

Having fully described my invention, what I claim, is:

1. A clay products cutting machine comprising an endless conveying table, a cutting drum provided with a plurality of meshing gears in operative relation with said table, and a means for simultaneously operating said drum in proper unison with the movement of said table.

2. A machine of the character described comprising a frame, an endless sectional connected conveying table mounted in said frame, positive communicating sprockets supporting said table, a cutting drum provided with cutting arms and meshing gears in proper relation with said table, and a gearing mechanism operating said drum simultaneously with the movement of said table.

3. A machine of the character described comprising a frame, a sectional endless carrier mounted thereon, a drum above the table, a plurality of meshing gears carried by the drum, arms carried by the drum and controlled by the outermost gears, a stationary guide on the frame in alignment with the drum and to one side thereof, and trunnions on the arms and operating in the stationary guide for imparting vertical action to the cutting means.

4. A machine for cutting clay products in even lengths, comprising a moving table on which the material is placed, a drum stationed above the same, a plurality of cutting arms carried by said drum, a plurality of meshing gears carried by said drum by which the arms are evenly swung, a guide extending from the frame in which is a guide groove, and trunnions formed on the arms and registering with said guide grooves for guiding the arms to permit the cutting wires to enter the material on a vertical movement and for removing the same in like motion during the movement of the table and drum.

In testimony whereof I have signed my name to this specification.

MAX MUELLER.